United States Patent [19]
Covington

[11] Patent Number: 5,301,958
[45] Date of Patent: Apr. 12, 1994

[54] SEAL FOR SPIN-ON FILTER HAVING CIRCUMFERENTIAL RETAINING GROOVE

[75] Inventor: Edward A. Covington, Gastonia, N.C.
[73] Assignee: Dana Corporation, Toledo, Ohio
[21] Appl. No.: 927,117
[22] Filed: Aug. 7, 1992
[51] Int. Cl.$^5$ ............................................. F16J 15/10
[52] U.S. Cl. ................................... 277/183; 277/189; 210/450; 210/DIG. 17
[58] Field of Search ............... 277/169, 177, 181–184, 277/189; 210/440–444, 450, DIG. 17

[56] References Cited

U.S. PATENT DOCUMENTS

| | | |
|---|---|---|
| 2,873,132 | 2/1959 | Tanner . |
| 3,224,591 | 12/1965 | Sawyer . |
| 3,307,705 | 3/1967 | Halmenschlager .... 210/DIG. 17 X |
| 3,353,680 | 11/1967 | Niebergall . |
| 3,366,392 | 1/1968 | Kennel . |
| 3,472,523 | 10/1969 | Rentschler et al. . |
| 3,557,963 | 1/1971 | Offer . |
| 3,591,207 | 7/1971 | Fisher . |
| 3,677,412 | 7/1972 | Connor . |
| 3,848,880 | 11/1974 | Tanner . |
| 4,028,243 | 6/1977 | Offer et al. . |
| 4,168,237 | 9/1979 | Pickett et al. ........... 210/DIG. 17 X |
| 4,237,015 | 12/1980 | Fearnhead ............ 210/DIG. 17 X |
| 4,364,825 | 12/1982 | Connor, Jr. .................. 210/416.4 X |
| 4,473,471 | 9/1984 | Robichaud et al. ..... 210/DIG. 17 X |
| 4,743,374 | 5/1988 | Stifelman ............... 210/DIG. 17 X |
| 4,832,844 | 5/1989 | Ayers ...................... 210/DIG. 17 X |
| 4,969,994 | 11/1990 | Misgen et al. ................... 210/443 X |

Primary Examiner—William A. Cuchlinski, Jr.
Assistant Examiner—Scott W. Cummings
Attorney, Agent, or Firm—MacMillan, Sobanski & Todd

[57] ABSTRACT

A seal for a spin-on filter of the type including an outer housing having a closed end and an open end, an end cover provided in the open end and a filter element disposed within the housing, the filter being adapted to be attached by screw threads to a mounting plate. The seal includes an annular gasket disposed within an annular seating recess formed in the end cover, the gasket having a circumferential groove formed on the inner face thereof. A portion of the end cover extends into the groove in the gasket to retain the gasket within the recess. The gasket is thus retained within the recess in the end cover but is freely rotatable relative to the end cover as the filter is rotated during installation. The seal requires no face selection, will feed in the lathe cut assembly insertion machines currently in use, will fit most conventional ding type gasket retaining recesses, and has rounded edges to eliminate trapped air.

22 Claims, 1 Drawing Sheet

SEAL FOR SPIN-ON FILTER HAVING CIRCUMFERENTIAL RETAINING GROOVE

BACKGROUND OF THE INVENTION

1. Field of the Invention

The invention relates to a seal for a fluid filter and, more particularly, to a seal for a spin-on type oil filter.

2. Summary of Related Art

Spin-on oil filters are well known devices often used in the lubrication system of internal combustion engines. These filters generally include an outer container and an end cover enclosing a hollow cylindrical filter element. An annular gasket is utilized for effecting a seal between the end cover of the filter and an engine block or adapter plate or the like on which the filter is used. Generally, a rectangular lathe cut gasket is disposed within an annular recess formed in the end cover. One or both sidewalls of the recess is then crimped to retain the gasket therein.

Such sealing gaskets are disadvantageous in that the gasket is prevented from rotating relative to the end cover. Once the gasket has made contact with the sealing base, the gasket is subjected to a shearing strain as the filter is rotated into final, operative position, despite the fact that the gasket is typically lubricated prior to installation. The development of such internal shear in the gasket may result in the gasket becoming dislodged and the failure of the seal.

In filters utilizing such sealing gaskets, there is also a tendency for air to become trapped between the gasket and the end cover upon installation. The trapped acts like a spring, so that once the air escapes, the effective torque applied to the gasket is reduced. This allows the filter to loosen due to vibration, and may even result in the filter becoming disengaged from the mount.

Some more recently developed filters have utilized a substantially round sealing gasket having a lip extending radially inwardly and tangentially therefrom. The gasket is retained by a portion of the end cover which is crimped to loosely engage the lip. The gasket is thereby capable of rotation relative to the end cover, limiting the internal shear experienced by the gasket during installation.

These sealing gaskets, however, cannot be used with conventional spin-on filter end covers. Additionally, such gaskets are difficult to automatically install in the end cover, and require proper face orientation prior to installation. Should such a gasket become dislodged, it is also difficult to reinstall by hand. Finally, the extended lip formed on these gaskets appears to be susceptible to cuts and tears, especially if not properly seated.

SUMMARY OF THE INVENTION

The present invention relates to a seal for a spin-on filter of the type including an outer housing having a closed end and an open end, an end cover provided in the open end and a filter element disposed within the housing. The filter is adapted to be attached by screw threads to a mounting plate. The filter seal of the present invention is comprised of an annular gasket disposed within an annular seating recess formed in the end cover. The gasket is provided with a circumferential groove formed on the inner face thereof. A retention means mounted on the end cover is received by and extends into the groove in the gasket for retaining the gasket within the recess. The gasket is thereby retained within the recess in the end cover, but is freely rotatable relative to the end cover as the filter is rotated during installation.

The novel construction of the present invention provides a seal for a spin-on filter which retains the gasket during handling while allowing the gasket to rotate freely in the seating recess during installation. Further, the seal requires no face selection, will feed in the lathe cut assembly insertion machines currently in use, will fit most conventional ding type gasket retaining recesses, and has rounded edges to eliminate trapped air.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
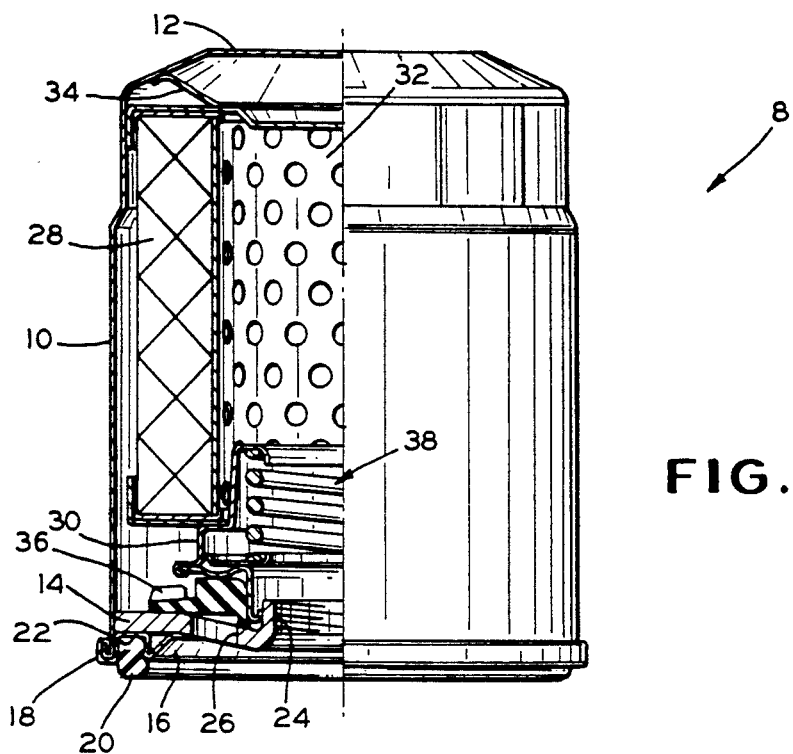
FIG. 1 is a side elevational view, partially in longitudinal section, of a filter unit in accordance with the present invention.

Referring now to the drawings, there is illustrated in FIG. 1 a spin-on filter unit in accordance with the present invention generally designated by the numeral 8. The filter unit 8 includes an outer housing or container 10 which is closed at one by an integral end wall 12. The other end of the housing 10 is provided with a reinforcing plate 14 and an annular end cover 16. The end cover 16 is attached around its inner periphery to the lower side of the reinforcing plate 14, as by spotwelding or the like, while the outer periphery of the end cover 16 is secured by a fluid-tight roll seam or joint 18 with the lower end of the container 10. A gasket 20, preferably formed of an oil resistant elastomeric material, such as nitrile rubber or the like, is disposed within an annular seating recess 22 formed on the lower side of the end cover 16, as will be described in more detail below. The gasket 20 is adapted to provide a fluid-tight seal for an oil inlet chamber (not shown) that is formed when the filter unit 8 is operatively mounted on a filter mount of, for example, an internal combustion engine.

The reinforcing plate 14 is provided with a centrally located, internally threaded sleeve 24 adapted to be screwed onto an externally threaded post (not shown) having a central passage for the flow of oil from the filter unit 8. The reinforcing plate 14 is also provided with a plurality of inlet openings 26 which allow the oil to be filtered to flow into the interior of the filter unit 8 from an inlet chamber. A hollow cylindrical filter element 28 is disposed within the container 10 and is spaced above the reinforcing plate 14 by suitable means, such as by the support structure 30. Thus, oil which enters the filter unit 8 through the inlet openings 26 flows radially outwardly to the space between the container 10 and the filter element 28, flows axially in this space towards the end wall 12, and then flows radially inwardly to be filtered as it passes through the filter element 28 to flow into a perforated center tube 32. Oil in the center tube 32 exits the filter unit 8 through the sleeve 24, flowing back through the central passage in the post to the engine.

The filter element 28 is held in position within the container 10 by any suitable means, such as by a leaf spring 34 disposed between the end of the filter element 28 and the end wall 12 of the container 10. The leaf spring 34 urges the filter element 28 against the support structure 30. Generally, the filter unit 8 is also provided with an anti-drainback valve 36 disposed adjacent the reinforcing plate 14, which prevents the reverse flow of oil through the filter when the engine is turned off. A pressure relief valve 38, disposed within the support structure 30, may also be utilized to permit oil flowing through the filter unit 8 to bypass the filter element 28 should it become unduly clogged.

As noted above, and as best illustrated in FIG. 2, the gasket 20 is disposed within the annular recess 22 formed in the end cover 16 by opposing sidewalls 40 and 42. The gasket 20 is preferably molded from a suitable, oil-resistant elastomeric material. One such suitable material has been found to be nitrile rubber. The gasket 20 is also preferably provided with rounded edges, to reduce the amount of air which may be trapped within the recess 22 during installation of the filter. By way of example, a radius of about 0.05 inches (about 0.127 cm) has been found to be suitable for this purpose.

The end cover 16 is provided with retention means which is received by and extends into a groove 44 formed on the inner face of the gasket 20, to thereby retain the gasket 20 within the recess 22. In the embodiment illustrated in FIGS. 1 and 2, the distal end of the inner sidewall 42 is angled radially outwardly, forming an annular projection 46 which extends into the groove 44 formed in the gasket 20. The annular projection 46 prevents the gasket 20 from falling out of the recess 22 during handling and installation of the filter.

The annular projection 46 extends into the groove 44, but does not tightly engage the gasket 20. The gasket 20 and recess 22 are dimensioned so that there is a gap between the outer periphery of the gasket 20 and the outer sidewall 40, or between the inner periphery of the gasket 20 and the inner sidewall 42. In one suitable embodiment, the inner diameter of the gasket 20 is substantially equal to the diameter of the inner sidewall 42, and the outer diameter of the gasket is about 0.025 inches (about 0.064 cm) less than the diameter of the outer sidewall 40. In this example, the depth of the groove 44 is about 0.025 inches (about 0.064 cm) and the diameter of the annular projection is about 0.050 inches (about 0.127 cm) greater than the diameter of the inner sidewall 42. Preferably, there is a gap both between the outer periphery of the gasket 20 and the outer sidewall 40, and between the inner periphery of the gasket 20 and the inner sidewall 42. Thus, in another embodiment, the inner diameter of the gasket 20 is about 0.030 inches (about 0.076 cm) greater than the diameter of the inner sidewall 42, and the outer diameter of the gasket is about 0.025 inches (about 0.064 cm) less than the diameter of the outer sidewall 40. The depth of the groove 44 is again about 0.025 inches (about 0.064 cm) and the diameter of the annular projection is about 0.050 inches (about 0.127 cm) greater than the diameter of the inner sidewall 42.

The gasket 20 is thus free to rotate within the recess 22 as the filter unit 8 is rotated during installation, reducing the amount of shear applied to the gasket 20. At the same time, the annular projection 46 engages the groove 44 sufficiently so that the gasket 20 is prevented from moving axially out of the recess 22. The gap provided between the gasket 20 and recess 22, in conjunction with the rounded edges of the gasket 20, permits any air trapped between the gasket 20 and recess 22 to escape upon installation of the filter unit 8.

Figure 2:
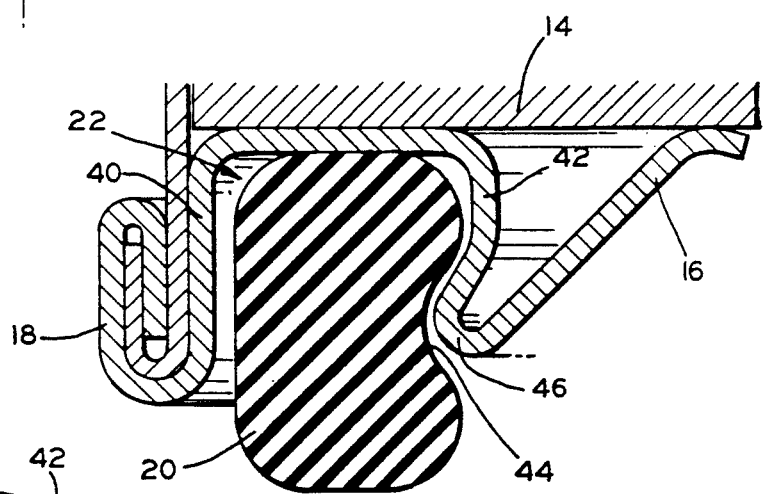
FIG. 2 is an enlarged view of a portion of the filter unit illustrated in FIG. 1.

Preferably, the groove 44 is formed approximately in the middle of the inner face of the gasket 20, so that the gasket 20 is substantially symmetrical, as illustrated in FIG. 2. Providing a symmetrical, generally "B" shaped gasket 20, aids the annular projection 46 in retaining the gasket 20 within the recess 22, despite the fact that gasket 20 is smaller than the recess 22 as noted above. Further, the symmetrical gasket 20 advantageously eliminates the need for face selection prior to assembly of the gasket 20 in the recess 22.

Figure 3:
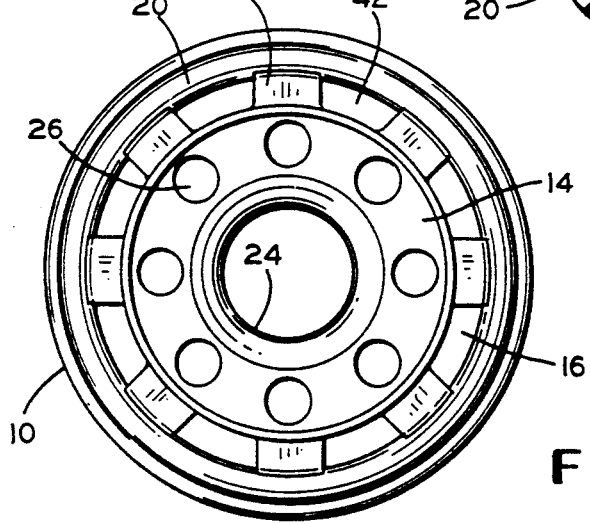
FIG. 3 is an end view of an alternate embodiment of the filter unit of the present invention.

In an alternate embodiment, illustrated in FIG. 3, the inner sidewall 42 of the end cover 16 is provided with a plurality of cirumferentially spaced, radially outwardly extending tabs or dings 48 as are employed on conventional spin-on filter end covers. The tabs 48 are typically formed integrally with the sidewall 42. Each of the tabs 48 extends into the groove 44 to retain the gasket 20 within the recess 22 in a similar manner to that for the annular projection 46 described above. Thus, the gasket 20 may advantageously be used with many of the end covers currently in use.

The seal of the present invention thus retains the gasket during handling, while allowing the gasket to rotate freely in the seating recess during installation. The seal requires no face selection, will feed in the lathe cut assembly insertion machines currently in use, will fit most conventional ding type gasket retaining recesses, and has rounded edges to eliminate trapped air.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A seal for a spin-on filter of the type including a generally cylindrical outer housing having a longitudinal axis and provided with a closed end and an open end, an end cover provided in the open end and a filter element disposed within the housing, the filter being adapted to be attached by screw threads to a mounting plate, the seal comprising:
    an annular gasket disposed within an annular seating recess formed in said end cover, said gasket having a circumferential groove formed therein and being substantially symmetrical about a generally radially extending plane;
    said end cover including retention means formed integrally therewith which is received by the groove in said gasket, for retaining said gasket within said recess;
    whereby said gasket is retained within the recess in said end cover but is substantially freely rotatable relative to said end cover as the filter is rotated during installation.

2. A seal for a spin-on filter as defined in claim 1, wherein said gasket is generally rectangular in cross section, having a pair of opposing axially extending surfaces and a pair of opposing radially extending surfaces, and wherein said circumferential groove is formed on an axially extending surface of said gasket.

3. A seal for a spin-on filter as defined in claim 1, wherein said retention means includes a plurality of cirumferentially spaced, radially outwardly extending tabs formed integrally with said end cover.

4. A seal for a spin-on filter as defined in claim 1, wherein said annular seating recess includes a radially inner sidewall and a radially outer sidewall, and wherein said retention means includes an annular projection extending radially outwardly from the inner sidewall of said annular seating recess and received by the groove in said gasket.

5. A seal for a spin-on filter as defined in claim 1, wherein the edges of said gasket are rounded to prevent air from being trapped between said gasket and said seating recess during installation of the filter.

6. A seal for a spin-on filter as defined in claim 1, wherein said annular seating recess includes a radially inner sidewall and a radially outer sidewall, and wherein the radially inner and outer axially extending surfaces of said gasket are spaced apart from the inner and outer sidewalls of said annular recess, respectively.

7. A seal for a spin-on filter of the type including a generally cylindrical outer housing having a longitudinal axis and provided with a closed end and an open end, an end cover provided in the open end and a filter element disposed within the housing, the filter being adapted to be attached by screw threads to a mounting plate, the seal comprising:

a substantially symmetrical, annular gasket disposed within an annular seating recess formed in said end cover, said annular recess including a radially inner sidewall and a radially outer sidewall, said gasket being generally rectangular in cross section, having a pair of opposing axially extending surfaces and a pair of opposing radially extending surfaces, and said gasket being provided with a circumferential groove formed on an axially extending surface thereof;

said end cover including retention means formed integrally therewith which is received by the groove in said gasket, for retaining said gasket within said recess;

wherein the radially inner and outer axially extending surfaces of said gasket are spaced apart from the inner and outer sidewalls of said annular recess, respectively, so that said gasket is retained within the recess in said end cover but is substantially freely rotatable relative to said end cover as the filter is rotated during installation.

8. A seal for a spin-on filter of the type including a generally cylindrical outer housing having a longitudinal axis and provided with a closed end and an open end, an end cover provided in the open end and a filter element disposed within the housing, the seal comprising:

an annular gasket disposed within an annular seating recess formed in said end cover, said gasket being generally rectangular in cross section, having a pair of opposing axially extending surfaces and a pair of opposing radially extending surfaces, and having a circumferential groove formed on one of the axially extending surfaces of said gasket; and said end cover including a retention means which is received by the groove in said gasket for retaining said gasket within said recess.

9. A seal for a spin-on filter as defined in claim 8, wherein said retention means loosely engages the groove in said gasket so that said gasket is retained within the recess in said end cover, but is substantially freely rotatable relative to said end cover as the filter is rotated during installation.

10. A seal for a spin-on filter as defined in claim 8, wherein said gasket is substantially symmetrical about a generally radially extending plane.

11. A seal for a spin-on filter as defined in claim 10, wherein said gasket is generally rectangular in cross section, having a pair of opposing axially extending surfaces and a pair of opposing radially extending surfaces, and wherein said circumferential groove is formed on an axially extending surface of said gasket.

12. A seal for a spin-on filter as defined in claim 8, wherein said retention means is formed integrally with said end cover.

13. A seal for a spin-on filter as defined in claim 12, wherein said retention means includes a plurality of cirumferentially spaced, radially outwardly extending tabs formed integrally with said end cover.

14. A seal for a spin-on filter as defined in claim 12, wherein said annular seating recess includes a radially inner sidewall and a radially outer sidewall, and wherein said retention means includes an annular projection extending radially outwardly from the inner sidewall of said annular seating recess and received by the groove in said gasket.

15. A seal for a spin-on filter as defined in claim 8, wherein the edges of said gasket are rounded to prevent air from being trapped between said gasket and said seating recess during installation of the filter.

16. A seal for a spin-on filter as defined in claim 8, wherein the inner diameter of said gasket is greater than the inner diameter of said annular recess.

17. A seal for a spin-on filter as defined in claim 8, wherein the outer diameter of said gasket is smaller than the outer diameter of said annular recess.

18. A seal for a spin-on filter as defined in claim 8, wherein the inner diameter of said gasket is greater than the inner diameter of said annular recess, and wherein the outer diameter of said gasket is smaller than the outer diameter of said annular recess.

19. A seal for a spin-on filter as defined in claim 8, wherein the radially inner axially extending surface of said gasket is spaced apart from said annular recess.

20. A seal for a spin-on filter as defined in claim 8, wherein the radially outer axially extending surface of said gasket is spaced apart from said annular recess.

21. A seal for a spin-on filter as defined in claim 8, wherein said annular seating recess includes a radially inner sidewall and a radially outer sidewall, and wherein the radially inner and outer axially extending surfaces of said gasket are spaced apart from the inner and outer sidewalls of said annular recess, respectively.

22. A seal for a spin-on filter of the type including a generally cylindrical outer housing having a longitudinal axis and provided with a closed end and an open end, an end cover provided in the open end and a filter element disposed within the housing, the seal comprising:

an annular gasket disposed within an annular seating recess formed in said end cover, said gasket having a circumferential groove formed therein and being substantially symmetrical about a generally radially extending plane; and said end cover including a retention means which is received by the groove in said gasket for retaining said gasket within said recess.

* * * * *